United States Patent
Mera

(10) Patent No.: US 11,248,082 B2
(45) Date of Patent: Feb. 15, 2022

(54) SURFACE PROTECTING RESIN MEMBER AND LIQUID SET

(71) Applicant: FUJIFILM BUSINESS INNOVATION CORP., Tokyo (JP)

(72) Inventor: Fumiaki Mera, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 335 days.

(21) Appl. No.: 16/559,034

(22) Filed: Sep. 3, 2019

(65) Prior Publication Data

US 2020/0270389 A1    Aug. 27, 2020

(30) Foreign Application Priority Data

Feb. 22, 2019   (JP) .............................. JP2019-030937

(51) Int. Cl.

| C08G 18/38 | (2006.01) |
| C08F 220/28 | (2006.01) |
| C09D 5/00 | (2006.01) |
| C09D 175/06 | (2006.01) |
| C08G 18/42 | (2006.01) |
| C08G 18/40 | (2006.01) |
| C08G 18/73 | (2006.01) |
| C08G 18/62 | (2006.01) |

(52) U.S. Cl.
CPC ........ *C08G 18/3802* (2013.01); *C08F 220/28* (2013.01); *C08G 18/4063* (2013.01); *C08G 18/4277* (2013.01); *C08G 18/6241* (2013.01); *C08G 18/73* (2013.01); *C09D 5/00* (2013.01); *C09D 175/06* (2013.01); *C08F 220/281* (2020.02)

(58) Field of Classification Search
None
See application file for complete search history.

(56) References Cited

U.S. PATENT DOCUMENTS

2017/0355876 A1*  12/2017  Klein ................. C08G 18/2885

FOREIGN PATENT DOCUMENTS

| JP | 2007-9219 A | 1/2007 |
| JP | 2015-40253 A | 3/2015 |

* cited by examiner

*Primary Examiner* — Christopher M Rodd
(74) *Attorney, Agent, or Firm* — Oliff PLC

(57) ABSTRACT

A surface protecting resin member includes a cured product of a composition containing an acrylic resin having a hydroxyl value within the range of 40 mgKOH/g to 280 mgKOH/g, a polyol having a hydroxyl value within the range of 40 mgKOH/g to 300 mgKOH/g, a multifunctional isocyanate, and a fluorotelomer alcohol represented by the following general formula $CF_3(CF_2)_n-(CH_2)_m-OH$, where n is an integer of 1 or more and m is an integer within the range of 1 to 4.

20 Claims, No Drawings

SURFACE PROTECTING RESIN MEMBER AND LIQUID SET

CROSS-REFERENCE TO RELATED APPLICATIONS

This application is based on and claims priority under 35 USC 119 from Japanese Patent Application No. 2019-030937 filed Feb. 22, 2019.

BACKGROUND

(i) Technical Field

The present disclosure relates to a surface protecting resin member and a liquid set.

(ii) Related Art

In various fields, surface protecting resin members, such as surface protecting films, have been provided to prevent or reduce flaws or scratches on surfaces. Surface protecting members formed of a self-healing acrylic urethane resin that heals flaws or scratches may be used for applications, such as protecting films for vehicle interior, protecting films for construction materials, and protecting films for touch panel displays of smartphones and tablets.

Japanese Unexamined Patent Application Publication No. 2007-009219 discloses a coating composition containing a caprolactone component and a polydimethylsiloxane-based copolymer to which a siloxane component is introduced to the skeleton thereof.

Japanese Unexamined Patent Application Publication No. 2015-040253 discloses a urethane (meth)acrylate copolymer containing a silicone moiety. The urethane (meth)acrylate copolymer containing a silicone moiety includes a silicone moiety having a specific structure in the copolymer molecule. The mass of the silicone moiety is less than the mass of a urethane moiety that is another component of the copolymer molecule. The urethane moiety includes a moiety derived from a polycarbonate diol. At least one terminal of the copolymer molecule is a (meth)acrylate moiety.

SUMMARY

A surface protecting resin member having excellent flaw resistance is typically designed to be flexible and thus has low surface slipperiness. To improve the surface slipperiness, a leveling agent or an additive may be added to a surface protecting resin member. However, as wear of the surface protecting resin member progresses, the proportion of a leveling agent or an additive in the surface decreases. Thus, after wear, the surface slipperiness is not sufficiently maintained.

Aspects of non-limiting embodiments of the present disclosure relate to providing a surface protecting resin member that has high flaw resistance and high surface slipperiness and that maintains surface slipperiness to a high extent, compared with a surface protecting resin member containing a silicone-based leveling agent and an acrylic urethane resin to which a fluorotelomer alcohol is not bonded.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a surface protecting resin member containing a cured product of a composition containing an acrylic resin having a hydroxyl value within the range of 40 mgKOH/g to 280 mgKOH/g, a polyol having a hydroxyl value within the range of 40 mgKOH/g to 300 mgKOH/g, a multifunctional isocyanate, and a fluorotelomer alcohol represented by the following general formula:

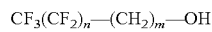
$$CF_3(CF_2)_n—(CH_2)_m—OH$$

where n is an integer of 1 or more and m is an integer within a range of 1 to 4.

DETAILED DESCRIPTION

Hereinafter, exemplary embodiments of the present disclosure will be described. The present exemplary embodiments are examples of the present disclosure, and the present disclosure is not limited to the following exemplary embodiments.

Surface Protecting Resin Member

First Exemplary Embodiment

A surface protecting resin member according to a first exemplary embodiment contains a cured product of a composition containing an acrylic resin having a hydroxyl value within the range of 40 mgKOH/g to 280 mgKOH/g (hereinafter, also simply referred to as "specific acrylic resin"), a polyol having a hydroxyl value within the range of 40 mgKOH/g to 300 mgKOH/g (hereinafter, also simply referred to as "specific polyol"), a multifunctional isocyanate, and a fluorotelomer alcohol represented by the following general formula (F1):

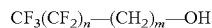
$$CF_3(CF_2)_n—(CH_2)_m—OH$$

where n is an integer of 1 or more and m is an integer within the range of 1 to 4.

Surface protecting members having excellent flaw resistance, such as surface protecting members formed of a self-healing acrylic urethane resin that can heal flaws or scratches, have been used for applications, such as protecting films for vehicle interior, protecting films for construction materials, and protecting films for touch panel displays of smartphones and tablets. "Self-healing" and "self-healing property" refer to the property of healing a flaw or a scratch of the surface caused by, for example, a contact with other substance (e.g., rubbing) and returning the surface state back to the original state or almost the original state.

A flaw-resistant protecting member, such as a self-healing acrylic urethane resin, deforms elastically and thus has excellent flaw resistance. Therefore, such a member is typically designed to be flexible and thus has low surface slipperiness.

To improve the surface slipperiness, for example, a Si-based leveling agent or a F-based additive may be added to a surface protecting resin member. However, as wear of a surface protecting resin member progresses, the proportion of the leveling agent or the additive in the surface decreases. Thus, after the surface becomes worn, the surface slipperiness is not sufficiently maintained. In other words, adding a leveling agent or an additive enhances the surface slipperiness at the beginning; however, the surface slipperiness is not maintained after wear.

Therefore, a surface protecting resin member that has excellent flaw resistance and high surface slipperiness and that maintains the surface slipperiness to a high degree is desired.

A surface protecting resin member according to the first exemplary embodiment has the above features and thus has excellent flaw resistance and high surface slipperiness and maintains the surface slipperiness to a high degree.

The reason for this is presumed as follows.

The surface protecting resin member according to the first exemplary embodiment contains a cured product of a composition containing a specific acrylic resin (a), a specific polyol (b), a fluorotelomer alcohol (c), and a multifunctional isocyanate (d). The cured product contains a urethane bond (—NHCOO—) formed by a reaction between a OH group of the specific acrylic resin (a), a OH group of the specific polyol (b), and a OH group of the fluorotelomer alcohol (c) and an isocyanate group of the multifunctional isocyanate (d). In other words, the cured product is a polyurethane resin.

The specific acrylic resin (a) and the specific polyol (b) form a crosslinked structure with the multifunctional isocyanate (d) therebetween, and thus, it is considered that the cured product exhibits excellent flaw resistance (self-healing property against flaws).

The fluorotelomer alcohol (c) forms a urethane bond with the multifunctional isocyanate (d) and is incorporated in the above crosslinked structure. The fluorotelomer alcohol (c) includes a OH group at one terminal, as shown in general formula (F1). Thus, only one terminal is bonded to the crosslinked structure. Therefore, the bonded fluorotelomer alcohol (c) moves freely in the crosslinked structure and tends to be present near the surface of the resin member. As a result, the amount of fluorine atoms increases at the surface of the resin member, and thus, it is considered that the surface slipperiness is enhanced.

The fluorotelomer alcohol (c) is bonded to the crosslinked structure of the cured product, as described above. Thus, compared with a case in which, for example, fluorine-based particles that do not bond to the structure are added, the disappearance, from the surface, of the fluorine atoms exposed to the surface of the resin member (e.g., such as detachment of particles from the surface) is suppressed. Furthermore, the fluorotelomer alcohol (c) is bonded to the crosslinked structure and thus, is present inside the resin member. Therefore, when the surface of the resin member becomes worn, the fluorotelomer alcohol (c) inside the resin member is exposed to the surface. It is considered that the surface slipperiness is maintained to a high degree, accordingly.

Due to the above features, the surface protecting resin member according to the first exemplary embodiment has excellent flaw resistance and high surface slipperiness and maintains the surface slipperiness to a high degree.

The surface protecting resin member according to the first exemplary embodiment has high water repellency and oil repellency and maintains the water repellency and oil repellency to a high degree.

The reason for this is presumed as follows.

In the surface protecting resin member according to the first exemplary embodiment, as described above, the fluorotelomer alcohol (c) is bonded to the crosslinked structure in a freely movable state and tends to be present near the surface of the resin member. Therefore, the amount of fluorine atoms increases at the surface of the resin member, and thus, it is considered that high water repellency and oil repellency are exhibited.

As described above, compared with a case in which, for example, fluorine-based particles that do not bond to the structure, are added, adding the fluorotelomer alcohol (c) suppresses the disappearance, from the surface, of the fluorine atoms exposed to the surface of the resin member. Furthermore, the fluorotelomer alcohol (c) is bonded to the crosslinked structure and is present inside the resin member, and thus, when the surface of the resin member becomes worn, the fluorotelomer alcohol (c) inside the resin member is exposed to the surface. It is considered that the water repellency and oil repellency are also excellently maintained, accordingly.

Furthermore, the surface protecting resin member according to the first exemplary embodiment has high adhesion with respect to the substrate.

The reason for this is presumed as follows.

In the surface protecting resin member according to the first exemplary embodiment, as described above, the fluorotelomer alcohol (c) is bonded to the crosslinked structure in a freely movable state and tends to be present near the surface of the resin member. In other words, the fluorotelomer alcohol (c) is hardly present near the surface opposite to the outer surface, that is, at the interface between the resin member and the substrate. Thus, the amount of fluorine atoms present at the interface between the resin member and the substrate is decreased, and this suppresses the enhancement of releasability of the resin member at the interface between the resin member and the substrate. Therefore, it is considered that high adhesion with respect to the substrate is exhibited.

Furthermore, the surface protecting resin member according to the first exemplary embodiment exhibits high heat resistance as a resin member due to high heat resistance of the fluorotelomer alcohol (c).

Second Exemplary Embodiment

A surface protecting resin member according to a second exemplary embodiment contains a cured product of a composition containing an acrylic resin having a hydroxyl value within the range of 40 mgKOH/g to 280 mgKOH/g (specific acrylic resin), a polyol having a hydroxyl value within the range of 40 mgKOH/g to 300 mgKOH/g (specific polyol), and a multifunctional isocyanate.

The surface protecting resin member has a dynamic friction coefficient µ1 within the range of 0.8 to 1.5 in an environment of a temperature of 23° C. and a humidity of 55%.

The ratio of the dynamic friction coefficient 2 of the surface protecting resin member in an environment of a temperature of 23° C. and a humidity of 55% after a wear resistance test to the dynamic friction coefficient µ1, [µ2/µ1], is within the range of 0.8 to 1.2, the wear resistance test being a test in which the surface of a surface protecting resin member is rubbed back and forth 50 times with steel wool (#0000) under a load of 200 g.

The surface protecting resin member according to the second exemplary embodiment has the above features and thus, has excellent flaw resistance and high surface slipperiness and maintains the surface slipperiness to a high degree.

The surface protecting resin member according to the second exemplary embodiment contains a cured product of a composition containing the specific acrylic resin (a), the specific polyol (b), and the multifunctional isocyanate (d). The cured product contains a urethane bond (—NHCOO—) formed by a reaction between a OH group of the specific acrylic resin (a) and a OH group of the specific polyol (b)

and an isocyanate group of the multifunctional isocyanate (d). In other words, the cured product is a polyurethane resin. The specific acrylic resin (a) and the specific polyol (b) form a crosslinked structure with the multifunctional isocyanate (d) therebetween, and thus, it is considered that the cured product exhibits excellent flaw resistance (self-healing property against flaws).

The dynamic friction coefficient $\mu 1$ of the surface protecting resin member is within the range of 0.8 to 1.5 in an environment of a temperature of 23° C. and a humidity of 55%. The dynamic friction coefficient $\mu 1$ is preferably within the range of 0.8 to 1.4 and more preferably 0.8 to 1.3.

The dynamic friction coefficient $\mu 1$ is 1.5 or less, in other words, the dynamic friction coefficient is not excessively high. Thus, high surface slipperiness is exhibited. On the other hand, the dynamic friction coefficient $\mu 1$ is 0.8 or more, in other words, the dynamic friction coefficient is not excessively low. Thus, recoating properties are reliably exhibited.

The ratio of the dynamic friction coefficient $\mu 2$ of the surface protecting resin member in an environment of a temperature of 23° C. and a humidity of 55% after the above wear resistance test to the dynamic friction coefficient $\mu 1$, $[\mu 2/\mu 1]$, is within the range of 0.8 to 1.2. The ratio $[\mu 2/\mu 1]$ is preferably within the range of 0.8 to 1.15 and more preferably 0.8 to 1.1.

The ratio $[\mu 2/\mu 1]$ is 1.2 or less, in other words, the change in the dynamic friction coefficient between before and after the wear resistance test is low. Thus, when the surface protecting resin member becomes worn, the surface slipperiness is maintained to a high degree. On the other hand, the ratio $[\mu 2/\mu 1]$ is 0.8 or more, in other words, the dynamic friction coefficient after the wear resistance test is not excessively low. Thus, recoating properties are reliably exhibited.

The method for measuring the dynamic friction coefficient of the surface will be described later.

The method for controlling the dynamic friction coefficient $\mu 1$ and the ratio $[\mu 2/\mu 1]$ of the surface protecting resin member according to the second exemplary embodiment within the above respective ranges may be any method. For example, the surface protecting resin member according to the first exemplary embodiment, in other words, a surface protecting resin member containing a cured product of a composition containing the specific acrylic resin (a), the specific polyol (b), the fluorotelomer alcohol (c), and the multifunctional isocyanate (d), is likely to have a dynamic friction coefficient $\mu 1$ and a ratio $[\mu 2/\mu 1]$ within the above respective ranges.

The surface protecting resin member according to the first exemplary embodiment may further satisfy the features of the surface protecting resin member according to the second exemplary embodiment. In other words, the surface protecting resin member according to the first exemplary embodiment may have a dynamic friction coefficient $\mu 1$ and a ratio $[\mu 2/\mu 1]$ within the above respective ranges.

The expression "the surface protecting resin member according to the present exemplary embodiment" refers to both of the surface protecting resin member according to the first exemplary embodiment and the surface protecting resin member according to the second exemplary embodiment.

Hereinafter, to describe the surface protecting resin member according to the present exemplary embodiment, the surface protecting resin member according to the first exemplary embodiment, which is also a resin member to obtain the surface protecting resin member according to the second exemplary embodiment, will be mainly described.

Formation of Surface Protecting Resin Member

The method for forming the surface protecting resin member according to the first exemplary embodiment may be any method. The surface protecting resin member according to the first exemplary embodiment may be formed by curing a composition for forming the surface protecting resin member that contains the specific acrylic resin (a), the specific polyol (b), the fluorotelomer alcohol (c), and the multifunctional isocyanate (d).

The composition for forming the surface protecting resin member, which is used to form the surface protecting resin member according to the first exemplary embodiment, may be the following liquid set.

First Aspect of Liquid Set liquid A1 containing the specific acrylic resin (a)
liquid A2 containing the specific polyol (b)
liquid B1 containing a multifunctional isocyanate The liquid set contains the liquid A1, the liquid A2, and the liquid B1, and at least one of the liquid A1, the liquid A2, and the liquid B1 contains the fluorotelomer alcohol (c).

The liquid A1, the liquid A2, and the liquid B1 are mixed together. A reaction accelerator (catalyst) may be further added. The liquid mixture is applied to a substrate (e.g., a polyimide film, an aluminum plate, or a glass plate) to form a film, and thereafter, the film is cured by heating to form the surface protecting resin member.

Second Aspect of Liquid Set liquid A containing the specific acrylic resin (a) and the specific polyol (b)
liquid B2 containing a multifunctional isocyanate The liquid set contains the liquid A and the liquid B2, and at least one of the liquid A and the liquid B2 contains the fluorotelomer alcohol (c).

The liquid A and the liquid B2 are mixed together. A reaction accelerator (catalyst) may be further added. The liquid mixture is applied to a substrate (e.g., a polyimide film, an aluminum plate, or a glass plate) to form a film, and thereafter, the film is cured by heating to form the surface protecting resin member.

In the first aspect, at least the liquid B1 may contain the fluorotelomer alcohol (c). In the second aspect, at least the liquid B2 may contain the fluorotelomer alcohol (c).

In the first aspect, the liquid B1 containing a multifunctional isocyanate contains the fluorotelomer alcohol (c) in advance, and in the second aspect, the liquid B2 containing a multifunctional isocyanate contains the fluorotelomer alcohol (c) in advance. Thus, in each of the first and second aspects, the reaction percentage of the fluorotelomer alcohol (c) (i.e., the proportion of the fluorotelomer alcohol (c) bonded to the multifunctional isocyanate) may be increased. As a result, a surface protecting resin member that has high surface slipperiness and that maintains the surface slipperiness to a high degree is likely to be obtained.

The reaction percentage of the fluorotelomer alcohol (c) increases, and thus, when a particle is included, migration of the particle (i.e., bleed-out) is likely to be suppressed.

The composition for forming the surface protecting resin member, which is used to form the surface protecting resin member according to the first exemplary embodiment, is not limited to the first aspect and the second aspect.

In the first aspect, neither of the liquid A1, the liquid A2, nor the liquid B1 may contain the fluorotelomer alcohol (c), and liquid C containing the fluorotelomer alcohol (c) may be provided. In the second aspect, neither of the liquid A nor the liquid B2 may contain the fluorotelomer alcohol (c), and liquid C containing the fluorotelomer alcohol (c) may be provided.

Furthermore, in the first aspect, neither of the liquid A1, the liquid A2, nor the liquid B1 may contain the fluorotelomer alcohol (c), and the composition may contain the fluorotelomer alcohol (c) that is not dispersed in the liquid. In the second aspect, neither of the liquid A nor the liquid B2 may contain the fluorotelomer alcohol (c), and the composition may contain the fluorotelomer alcohol (c) that is not dispersed in the liquid.

Next, the components contained in the surface protecting resin member according to the first exemplary embodiment will be fully described.

Cured Product

The cured product contained in the surface protecting resin member according to the first exemplary embodiment is formed by curing a composition containing the specific acrylic resin (a), the specific polyol (b), the fluorotelomer alcohol (c), and the multifunctional isocyanate (d).

(a) Specific Acrylic Resin

In the first exemplary embodiment, the specific acrylic resin having a hydroxy group (—OH) is used as the acrylic resin. The specific acrylic resin has a hydroxyl value within the range of 40 mgKOH/g to 280 mgKOH/g.

Examples of the specific acrylic resin having a hydroxy group include an acrylic resin having a hydroxy group in the molecular structure and an acrylic resin having a carboxy group in the molecular structure.

A hydroxy group is introduced by using a monomer having a hydroxy group as the monomer for forming the specific acrylic resin. The monomer having a hydroxy group may be an ethylenic monomer having a hydroxy group (1), such as hydroxymethyl (meth)acrylate, hydroxyethyl (meth)acrylate, hydroxypropyl (meth)acrylate, hydroxybutyl (meth)acrylate, or N-methylolacrylamine.

Furthermore, an ethylenic monomer having a carboxy group (2), such as (meth)acrylic acid, crotonic acid, itaconic acid, fumaric acid, or maleic acid, may be used.

A monomer having no hydroxy group may be used in combination, as a monomer for forming the specific acrylic resin. The monomer having no hydroxy group may be an ethylenic monomer that may be copolymerized with the monomer (1) or the monomer (2). Such a monomer may be an alkylester (meth)acrylate, such as methyl (meth)acrylate, ethyl (meth)acrylate, propyl (meth)acrylate, butyl (meth)acrylate, n-propyl (meth)acrylate, n-butyl (meth)acrylate, isobutyl (meth)acrylate, 2-ethylhexyl (meth)acrylate, n-octyl (meth)acrylate, or n-dodecyl (meth)acrylate.

In the present specification, the word "(meth)acrylic acid" refers to acrylic acid and methacrylic acid.

Fluorine Atom

The specific acrylic resin preferably has a fluorine atom in the molecular structure thereof and more preferably has a side chain containing a fluorine atom.

Owing to the specific acrylic resin having a side chain containing a fluorine atom, the surface protecting resin member is likely to have high surface slipperiness. The reason for this is presumed as follows.

It is considered that a fluorine atom present in a side chain of the specific acrylic resin is movable in the crosslinked structure of the surface protecting resin member. Thus, a fluorine atom present in a side chain of the specific acrylic resin is likely to be exposed to the surface of the surface protecting resin member. Therefore, the surface protecting resin member has high surface slipperiness and is likely to have other characteristics, such as high water repellency, high oil repellency, and high adhesion with respect to the substrate.

The exposure of a fluorine atom present in a side chain of the specific acrylic resin to the surface enables a fluorine atom in the fluorotelomer alcohol (c) to be readily exposed to the surface. This also enables the surface protecting resin member to have high surface slipperiness, and the surface protecting resin member is likely to have other characteristics, such as high water repellency, high oil repellency, and high adhesion with respect to the substrate.

A fluorine atom is introduced by using a monomer having a fluorine atom as the monomer for forming the specific acrylic resin. Examples of the monomer having a fluorine atom include 2-(perfluorobutyl)ethyl acrylate, 2-(perfluorobutyl)ethyl methacrylate, 2-(perfluorohexyl)ethyl acrylate, 2-(perfluorohexyl)ethyl methacrylate, (perfluorohexyl)ethylene, hexafluoropropene, hexafluoropropene epoxide, and perfluoro(propyl vinyl ether).

A fluorine atom may be contained in a side chain of the specific acrylic resin. The side chain containing a fluorine atom may have 2 or more and 20 or less carbon atoms. The side chain containing a fluorine atom may be linear or branched.

The number of fluorine atoms in a molecule of the monomer containing a fluorine atom is not particularly limited and is preferably 1 or more and 25 or less and more preferably 3 or more and 17 or less.

To enhance the surface slipperiness, water repellency, oil repellency, and adhesion with respect to the substrate, the molar ratio of the side chain containing a fluorine atom to all side chains of the specific acrylic resin is preferably 7% or more, more preferably 7.5% or more, and still more preferably 8% or more.

From the viewpoint of reactivity and productivity, the upper limit of the molar ratio of the side chain containing a fluorine atom to all side chains of the specific acrylic resin is preferably 45% or less, more preferably 40% or less, and still more preferably 35% or less.

The molar ratio of the side chain containing a fluorine atom to all side chains of the specific acrylic resin may be calculated by chemical structure analysis, for example, using FT-IR and NMR, of the specific acrylic resin or the cured product.

Hydroxyl Value

The specific acrylic resin has a hydroxyl value within the range of 40 mgKOH/g to 280 mgKOH/g. The hydroxyl value is preferably within the range of 70 mgKOH/g to 200 mgKOH/g.

The hydroxyl value is 40 mgKOH/g or more, and thus, a polyurethane resin having a high crosslinking density is synthesized by polymerization. On the other hand, the hydroxyl value is 280 mgKOH/g or less, and thus, a polyurethane resin having an appropriate flexibility is obtained.

The hydroxyl value of the specific acrylic resin is adjusted by controlling, for example, the ratio of the amount of monomers having a hydroxy group to the amount of all monomers for synthesizing the specific acrylic resin.

The hydroxyl value represents the amount of potassium hydroxide (mg) required for acetylation of hydroxy groups in 1 g of a sample. The hydroxyl value in the present exemplary embodiment is measured by the method (potentiometric titration) defined by JIS K0070-1992. For a sample that does not dissolve in the solvent used in such a method, a solvent, such as dioxane or tetrahydrofuran (THF), is used.

Molecular Weight

The specific acrylic resin preferably has a weight-average molecular weight of 5,000 or more and 100,000 or less and more preferably 10,000 or more and 50,000 or less.

The specific acrylic resin has a weight-average molecular weight of 5,000 or more, and thus, the flaw resistance (e.g., self-healing property) of a surface protecting resin member formed by using such an acrylic resin is likely to be enhanced. On the other hand, the specific acrylic resin has a weight-average molecular weight of 100,000 or less, and thus, a surface protecting resin member having excellent flexibility is likely to be obtained.

The weight-average molecular weight of the specific acrylic resin is measured by gel permeation chromatography (GPC). The molecular weight is measured by using HLC-8120GPC manufactured by Tosoh Corporation as a measuring apparatus, TSKgel SuperHM-M (15 cm) manufactured by Tosoh Corporation as a column, and tetrahydrofuran (THF) as the solvent. The weight-average molecular weight is calculated from the measurement result by using a molecular weight correction curve prepared by using monodispersed polystyrene standard samples.

The specific acrylic resin is synthesized by mixing the monomers together, performing typical radical polymerization or ionic polymerization, and thereafter purifying the resultant polymer.

(b) Specific Polyol

In the first exemplary embodiment, the specific polyol containing a hydroxy group (—OH) is used as the polyol. The specific polyol has a hydroxyl value within the range of 40 mgKOH/g to 300 mgKOH/g.

The specific polyol has 2 or more hydroxy groups and has a structure in which such hydroxy groups are bonded to each other via a chain (e.g., organic chain). The chain connecting hydroxy groups to each other may have any number of carbon atoms. The polyol may be a polyol having hydroxy groups bonded to each other via a carbon chain having 6 or more carbon atoms (hereinafter, also simply referred to as "long-chain polyol").

The polyol is a long-chain polyol having hydroxy groups bonded to each other via a carbon chain having 6 or more carbon atoms, and thus, the surface protecting resin member is likely to have excellent flaw resistance (e.g., self-healing property).

Long-Chain Polyol

The long-chain polyol has plural hydroxy groups (—OH), and the hydroxy groups are bonded to each other via a carbon chain having 6 or more carbon atoms in a linear-chain portion thereof that connects the hydroxy groups to each other. In other words, in the long-chain polyol, all hydroxy groups are bonded to each other via carbon chains, and such carbon chains each have 6 or more carbon atoms in a linear-chain portion thereof that connects the hydroxy groups to each other.

The number of functional groups in the polyol (i.e., the number of hydroxy groups in one molecule of the long-chain polyol) may be within the range of 2 to 5 or 2 to 3.

In the long-chain polyol, the carbon chain having 6 or more carbon atoms refers to a chain having 6 or more carbon atoms in a linear-chain portion thereof that connects hydroxy groups to each other. The carbon chain having 6 or more carbon atoms may be an alkylene group or a divalent group formed of a combination of one or more types of alkylene groups and one or more groups selected from —O—, —C(=O)—, and —C(=O)—O—. The long-chain polyol in which hydroxy groups are connected to each other via a carbon chain having 6 or more carbon atoms may have a structure represented by —[CO(CH$_2$)$_{n1}$O]$_{n2}$—H (where n1 is 1 or more and 10 or less (preferably 3 or more and 6 or less and more preferably 5) and n2 is 1 or more and 50 or less (preferably 1 or more and 35 or less, more preferably 1 or more and 10 or less, and still more preferably 2 or more and 6 or less)).

Examples of the long-chain polyol include bifunctional polycaprolactone diols, trifunctional polycaprolactone triols, and tetrafunctional or higher-functional polycaprolactone polyols.

The bifunctional polycaprolactone diol may be a compound having two groups each having a hydroxy group at the terminal. Such a compound is represented by —CO(CH$_2$)$_{n11}$]$_{n12}$—H (where n11 is 1 or more and 10 or less (preferably 3 or more and 6 or less and more preferably 5) and n12 is 1 or more and 50 or less (preferably 3 or more and 35 or less)). Among such compounds, the compound represented by the following general formula (1) is preferred.

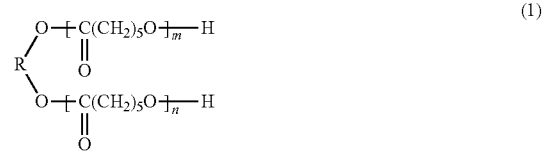

(1)

(In general formula (1), R represents an alkylene group or a divalent group formed of a combination of an alkylene group and one or more groups selected from —O— and —C(=O)—, and m and n are each independently an integer of 1 or more and 35 or less.)

In general formula (1), an alkylene group contained in the divalent group represented by R may be linear or branched. The alkylene group preferably has 1 or more and 10 or less carbon atoms and more preferably 1 or more and 5 or less carbon atoms.

The divalent group represented by R may be a linear or branched alkylene group having 1 or more and 10 or less carbon atoms (preferably 2 or more and 5 or less carbon atoms), or a group formed of two linear or branched alkylene groups that each have 1 or more and 5 or less carbon atoms (preferably 1 or more and 3 or less carbon atoms) and that are bonded to each other via —O— or —C(=O)— (preferably, —O—). Among such groups, a divalent group represented by *—C$_2$H$_4$—*, *—C$_2$H$_4$OC$_2$H$_4$—*, and *—C(CH$_3$)$_2$—(CH$_2$)$_2$—* are more preferred. Each of the above divalent groups is bonded at the portion denoted by *.

M and n are each independently an integer of 1 or more and 35 or less, preferably 2 or more and 10 or less, and still more preferably 2 or more and 5 or less.

The trifunctional polycaprolactone triol may be a compound having three groups each having a hydroxy group at the terminal. The compound is represented by [CO(CH$_2$)$_{n21}$O]$_{n22}$—H (where n21 is 1 or more and 10 or less (preferably 3 or more and 6 or less and more preferably 5), and n22 is 1 or more and 50 or less (preferably 1 or more and 28 or less)). Among such compounds, the compound represented by the following general formula (2) is preferred.

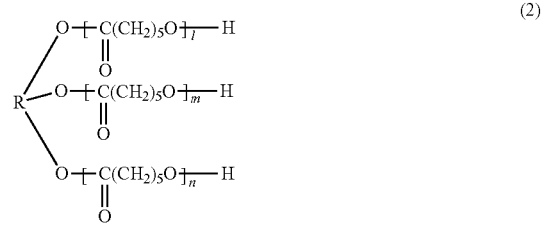

(2)

(in general formula (2), R represents a trivalent group formed by removing a single hydrogen atom from an alkylene group, or a trivalent group formed of a combination of a trivalent group formed by removing a single hydrogen atom from an alkylene group and one or more groups selected from an alkylene group, —O—, and —C(=O)—, and l, m, and n are each independently an integer of 1 or more and 28 or less, and l+m+n is 3 or more and 30 or less.)

In general formula (2), when R represents a trivalent group formed by removing a single hydrogen atom from an alkylene group, the trivalent group may be linear or branched. The trivalent group formed by removing a single hydrogen atom from an alkylene group is preferably an alkylene group having 1 or more and 10 or less carbon atoms and more preferably an alkylene group having 1 or more and 6 or less carbon atoms.

The R may represent a trivalent group formed of a combination of a trivalent group formed by removing a single hydrogen atom from the above alkylene group and one or more groups selected from an alkylene group (e.g., alkylene group having 1 or more and 10 or less of carbon atoms), —O—, and —C(=O)—.

The trivalent group represented by R may be a trivalent group formed by removing a single hydrogen atom from a linear or branched alkylene group having 1 or more and 10 or less carbon atoms (preferably 3 or more and 6 or less carbon atoms). Among such groups, a trivalent group represented by *—CH$_2$—CH(—*)—CH$_2$—*, CH$_3$—C(—*)(—*)—(CH$_2$)$_2$—*, or CH$_3$CH$_2$C(—*)(—*)(CH$_2$)$_3$—* is more preferred. Each of the above trivalent groups is bonded at the portion denoted by *.

L, m and n are each independently an integer of 1 or more and 28 or less, preferably 2 or more and 10 or less, and still more preferably 2 or more and 5 or less. L+m+n is 3 or more and 30 or less, preferably 6 or more and 30 or less, and still more preferably 6 or more and 20 or less.

Such specific polyols may be used alone or in a combination of two or more.

The molar ratio of the hydroxy groups in the specific polyol (b) [OH$_P$] to the hydroxy groups in the specific acrylic resin (a) [OH$_A$], [OH$_P$/OH$_A$], is preferably 0.1 or more and 10 or less and more preferably 0.5 or more and 5 or less.

Hydroxyl Value

The specific polyol has a hydroxyl value within the range of 40 mgKOH/g to 300 mgKOH/g, preferably 50 mgKOH/g to 250 mgKOH/g, and more preferably 60 mgKOH/g to 250 mgKOH/g.

The hydroxyl value is 40 mgKOH/g or more, and thus, a urethane resin having a high crosslinking density is synthesized by polymerization. On the other hand, the hydroxyl value is 300 mgKOH/g or less, and thus, a urethane resin having appropriate flexibility is likely to be obtained.

The hydroxyl value represents the amount of potassium hydroxide (mg) required for acetylation of hydroxy groups in 1 g of a sample. The hydroxyl value in the present exemplary embodiment is measured by the method (potentiometric titration) defined by JIS K0070-1992. For a sample that does not dissolve in the solvent used in such a method, a solvent, such as dioxane or THF, is used.

(c) Fluorotelomer Alcohol

In the first exemplary embodiment, the fluorotelomer alcohol represented by the following general formula (F1) is used;

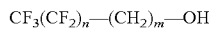  general formula (F1)

where n is an integer of 1 or more and m is an integer within the range of 1 to 4.

In general formula (F1), n is preferably within the range of 4 to 19 (i.e., a perfluoro group of the fluorotelomer alcohol has 5 or more and 20 or less carbon atoms), more preferably 4 to 10 (i.e., a perfluoro group of the fluorotelomer alcohol has 5 or more and 11 or less carbon atoms), still more preferably 4 to 6 (i.e., a perfluoro group of the fluorotelomer alcohol has 5 or more and 7 or less carbon atoms), and still more preferably 4 to 5 (i.e., a perfluoro group of the fluorotelomer alcohol has 5 or more and 6 or less carbon atoms).

In general formula (F1), n is 4 or more, and thus, the surface slipperiness of the surface protecting resin member is likely to be enhanced. On the other hand, n is 19 or less, and thus, the surface protecting resin member has excellent adhesion with respect to the substrate.

In general formula (F1), m (the number of carbon atoms in a hydrocarbon group of the fluorotelomer alcohol) is within the range of 1 to 4, and more preferably 1 to 2.

Examples of the fluorotelomer alcohol include 6:2-fluorotelomer alcohol (CF$_3$(CF$_2$)$_5$—(CH$_2$)$_2$—OH), 6:1-fluorotelomer alcohol (CF$_3$(CF$_2$)$_5$—CH$_2$—OH), 5:2-fluorotelomer alcohol (CF$_3$(CF$_2$)$_4$—(CH$_2$)$_2$—OH), 5:1-fluorotelomer alcohol (CF$_3$(CF$_2$)$_4$—CH$_2$—OH), 4:2-fluorotelomer alcohol (CF$_3$(CF$_2$)$_3$—(CH$_2$)$_2$—OH), and 4:1-fluorotelomer alcohol (CF$_3$(CF$_2$)$_3$—CH$_2$—OH).

Reaction Percentage of Fluorotelomer Alcohol

The fluorotelomer alcohol is bonded to an isocyanate group of the multifunctional isocyanate (d) to form a urethane bond (—NHCOO—) and incorporated in the crosslinked structure of the cured product forming the surface protecting resin member.

Here, the mass ratio of the fluorotelomer alcohol bonded to the multifunctional isocyanate in the cured product to the total amount of fluorotelomer alcohol in the composition for forming the surface protecting resin member (i.e., the reaction percentage of the fluorotelomer alcohol) is preferably 60 mass % or more, more preferably 70 mass % or more, and still more preferably 80 mass % or more, and may be 100 mass %.

The reaction percentage of the fluorotelomer alcohol is 60 mass % or more, and thus, a surface protecting resin member that has high surface slipperiness and that maintains the surface slipperiness to a high degree is likely to be obtained.

The reaction percentage of the fluorotelomer alcohol is 60 mass % or more, and thus, when a particle is included, migration of the particle (i.e., bleed-out) is likely to be suppressed.

The reason for this is presumed as follows.

The fluorotelomer alcohol forms a urethane bond with the multifunctional isocyanate (d) and is incorporated in the crosslinked structure of the cured product. A single terminal of the fluorotelomer alcohol is bonded, and thus, the fluorotelomer alcohol is freely movable in the crosslinked structure. Therefore, the bonded fluorotelomer alcohol tends to be near the surface of the resin member, and the molecules thereof are self-oriented near the surface. According to this, the surface of the resin member is highly cured, and it is considered that migration of the particle (i.e., bleed-out) is suppressed.

The method for controlling the reaction percentage of the fluorotelomer alcohol within the above range may be any method. The method may include mixing the multifunctional isocyanate (d) and the fluorotelomer alcohol (c) together in advance, promoting the reaction of the mixture, and, after the reaction progresses, adding the specific acrylic resin (a) and the specific polyol (b) to the mixture to prepare the composition for forming the surface protecting resin member.

An exemplary method for preparing the composition may include adding the fluorotelomer alcohol (c) to the liquid B1 containing the multifunctional isocyanate (d) in advance during preparation of the liquid set according to the first aspect, promoting the reaction of the mixture, and after the reaction progresses, adding the liquid A1 containing the specific acrylic resin (a) and the liquid A2 containing the specific polyol (b) to the mixture.

The reaction percentage of the fluorotelomer alcohol, in other words, the mass ratio of the fluorotelomer alcohol bonded to the multifunctional isocyanate in the cured product, relative to the total amount of the fluorotelomer alcohol in the composition for forming the surface protecting resin member is calculated by a method using Fourier transform infrared spectroscopy (FT-IR).

Specifically, the amount of the structural unit "—$(CH_2)_m$—NHCO—" in the surface protecting resin member is analyzed by FT-IR, and the amount of the structural unit "$CF_3(CF_2)_n$—" is analyzed by nuclear magnetic resonance (NMR). Then the ratio is calculated from the results to determine the reaction percentage of the fluorotelomer alcohol.

Amount of Fluorotelomer Alcohol

The amount of the fluorotelomer alcohol relative to the total solid in the composition (i.e., composition for forming the surface protecting resin member) is preferably within the range of 1 mass % to 20 mass %, more preferably 1 mass % to 10 mass %, and still more preferably 1 mass % to 8 mass %

The amount of the fluorotelomer alcohol is, in other words, the sum of the mass of unreacted fluorotelomer alcohol and the mass of the residues of the reacted fluorotelomer alcohol in terms of the fluorotelomer alcohol, in the surface protecting resin member.

The amount of the fluorotelomer alcohol is 1 mass % or more, and thus, the surface slipperiness of the surface protecting resin member is likely to be enhanced. On the other hand, the amount of the fluorotelomer alcohol is 20 mass % or less, and thus, the surface protecting resin member has excellent adhesion with respect to the substrate.

The mass ratio of the fluorotelomer alcohol to the total solid is preferably within the range of 1 mass % to 20 mass %, more preferably 1 mass % to 10 mass %, and still more preferably 1 mass % to 8 mass %.

(d) Multifunctional Isocyanate

The multifunctional isocyanate (d) includes plural isocyanate groups (—NCO), and reacts with, for example, a hydroxy group of the specific acrylic resin (a) and a hydroxy group of the specific polyol (b) to form a urethane bond (—NHCOO—). The multifunctional isocyanate (d) functions as a crosslinking agent that crosslinks the specific acrylic resins (a) to each other, the specific acrylic resin (a) and the specific polyol (b) to each other, and the specific polyols (b) to each other.

The multifunctional isocyanate is not particularly limited and may be a bifunctional diisocyanate, such as methylene diisocyanate, toluene diisocyanate, hexamethylene diisocyanate, or isophorone diisocyanate. A multifunctional isocyanate, such as a multimer of hexamethylene polyisocyanate having a biuret structure, isocyanurate structure, adduct structure, or elastic structure may be used.

A commercial product, such as a polyisocyanate manufactured by Asahi Kasei Corp. (DURANATE) may be used as the multifunctional isocyanate.

Such multifunctional isocyanates may be used alone or in a combination of two or more.

Ratio of Amounts of (a), (b), (c), and (d) The amount of the multifunctional isocyanate (d) is preferably adjusted such that the molar ratio of isocyanate groups (—NCO) to the total amount of hydroxy groups (—OH) in the specific acrylic resin (a), the specific polyol (b), and the fluorotelomer alcohol (c) is 0.8 or more and 1.6 or less, and more preferably adjusted such that the molar ratio is 1 or more and 1.3 or less.

The amount of the fluorotelomer alcohol (c) is preferably adjusted such that the molar ratio of hydroxy groups (—OH) to the isocyanate groups (—NCO) in the multifunctional isocyanate (d) is 0.5 or more and 1.5 or less, and more preferably adjusted such that the molar ratio is 0.7 or more and 1.2 or less.

Another Additive

The surface protecting resin member according to the first exemplary embodiment may further contain another additive. Such an additive may be a reaction accelerator that accelerates the reaction between hydroxy groups (—OH) in the specific acrylic resin (a), the specific polyol (b), and the fluorotelomer alcohol (c) and an isocyanate group (—NCO) in the multifunctional isocyanate (d). Furthermore, examples of the additive include particles (e.g., ultraviolet absorber particles), radical scavengers, and antistatic agents.

Reaction Accelerator

The reaction accelerator that accelerates the reaction between hydroxy groups (—OH) in the specific acrylic resin (a), the specific polyol (b), and the fluorotelomer alcohol (c) and an isocyanate group (—NCO) in the multifunctional isocyanate (d) may be a metal catalyst, such as a tin catalyst or a bismuth catalyst. Examples of the metal catalyst include NEOSTANN U-28, U-50, U-600, U-100, U-200, and U-810, and Tin(II) stearate, which are manufactured by Nitto Kasei Co., Ltd. Examples of the metal catalyst further include XC-C277, XK-640, XK-628, 348, and XC-C227, which are manufactured by Kusumoto Chemicals, Ltd., Borchi Kat 315, Borchi Kat 320, and Borchi Kat 24, which are manufactured by Borchers Inc., and STANOCT manufactured by Mitsubishi Chemical Corporation.

Particle (Ultraviolet Absorber Particle)

To enhance the light resistance against ultraviolet light to suppress the degradation of the surface protecting resin member, ultraviolet absorber particles may be added to the surface protecting resin member according to the first exemplary embodiment.

The ultraviolet absorber particles may be known ultraviolet absorber particles, such as benzophenone-based, benzotriazole-based, salicylic acid ester-based, oxalic acid amide-based, or nickel complex salt-based ultraviolet absorber particles.

Such ultraviolet absorber particles may be used alone or in a combination of two or more types.

When ultraviolet absorber particles are added, the amount of ultraviolet absorber particles in the surface protecting resin member is preferably 0.1 mass % or more and 2 mass % or less and more preferably 0.1 mass % or more and 1.5 mass % or less.

How to add the particle (e.g., ultraviolet absorber particle) to the composition for forming the surface protecting resin member is not limited.

For example, when the liquid set according to the first aspect is used as the composition, the particle may be added to any of the liquid A1, the liquid A2, and the liquid B1. When the liquid set according to the second aspect is used as the composition, the particle may be added to any of the liquid A and the liquid B2. The particle does not have to be added to any liquid in the liquid set in advance and may be added to the composition after the composition is prepared by mixing the liquids together.

Radical Scavenger

To suppress the reaction of polymerization components in the composition for forming the surface protecting resin member to obtain storage stability, a radical scavenger may be added to the surface protecting resin member according to the first exemplary embodiment.

The radical scavenger may be a known radical scavenger, such as a hydroquinone-based radical scavenger (e.g., hydroquinone or a hydroquinone derivative), a benzoquinone-based radical scavenger (benzoquinone or a benzoquinone derivative), tetramethylpiperidine-N-oxide (TEMPO), a hindered phenol-based radical scavenger, or a hindered amine-based radical scavenger.

Such radical scavengers may be used alone or in a combination of two or more.

When a radical scavenger is added, the amount of the radical scavenger in the surface protecting resin member is preferably 0.1 mass % or more and 1.5 mass % or less and more preferably 0.1 mass % or more and 1 mass % or less.

Antistatic Agent

Specific examples of the antistatic agent include cationic surfactant compounds (e.g., tetraalkylammonium salts, trialkylbenzylammonium salts, alkylamine hydrochlorides, and imidazolium salts), anionic surfactant compounds (e.g., alkylsulfonic acid salts, alkylbenzene sulfonic acid salts, and alkylphosphates), nonionic surfactant compounds (e.g., glycerol fatty acid esters, polyoxyalkylene ethers, polyoxyethylene alkylphenyl ethers, N,N-bis(2-hydroxyethyl)alkylamines, hydroxyalkyl monoethanolamines, polyoxyethylene alkylamines, fatty acid diethanolamides, and polyoxyethylene alkylamine fatty acid esters), and amphoteric surface active compounds (e.g., alkylbetaines and alkylimidazolium betaines).

The antistatic agent may be a compound containing quaternary ammonium.

Specifically, the antistatic agent may be tri-n-butylmethylammonium bistrifluoromethanesulfonimide, lauryltrimethylammonium chloride, octyldimethylethylammonium ethyl sulfate, didecyldimethylammonium chloride, lauryldimethylbenzylammonium chloride, stearyldimethylhydroxyethylammonium para-toluene sulfonate, tributylbenzylammonium chloride, lauryldimethylaminoacetic acid betaine, lauric acid amide propyl betaine, octanic acid amide propyl betaine, or polyoxyethylene stearyl amine. Among such compounds, tri-n-butylmethylammonium bistrifluoromethanesulfonimide is preferred.

An antistatic agent having a high molecular weight may be used.

Examples of the antistatic agent having a high molecular weight include polymers synthesized by polymerizing an acrylate containing a quaternary ammonium base, polystyrene sulfonic acid-type polymers, polycarboxylic acid-type polymers, polyether ester-type polymers, ethylene oxide-epichlorohydrin-type polymers, and polyetheresteramide-type polymers.

A polymer synthesized by polymerizing an acrylate containing a quaternary ammonium base may be a polymer having at least the following structural unit (A).

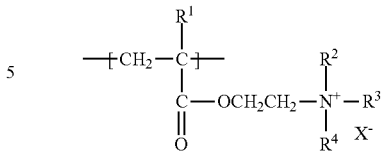

(in the structural unit (A), $R^1$ represents a hydrogen atom or a methyl group, $R^2$, $R^3$, and $R^4$ each independently represent an alkyl group, and X represents an anion.) The antistatic agent having a high molecular weight may be synthesized by polymerization by a known method.

The antistatic agent having a high molecular weight may contain only a polymer formed of identical polymerizable monomers or contain a combination of two or more types of polymers formed of different polymerizable monomers.

The surface resistance of the surface protecting resin member in the first exemplary embodiment may be adjusted within the range of $1 \times 10^9 \Omega/sq$ to $1 \times 10^{14} \Omega/sq$, and the volume resistance thereof may be adjusted within the range of $1 \times 10^8$ $\Omega$cm to $1 \times 10^{13}$ $\Omega$cm.

The surface resistance and the volume resistance are measured in an environment of a temperature of 22° C. and a humidity of 55% RH by using HIRESTA UPMCP-450-type UR Probe manufactured by DIA INSTRUMENTS Co., Ltd. in conformity with JIS-K6911.

When the surface protecting resin member contains an antistatic agent, the type and amount of the antistatic agent may be changed to control the surface resistance and the volume resistance of the surface protecting resin member.

Such antistatic agents may be used alone or in a combination of two or more.

Physical Properties of Surface Protecting Resin Member

Thickness

The surface protecting resin member may be a surface protecting resin film. The surface protecting resin film may have any thickness and may have a thickness of 1 µm or more and 100 µm or less or 5 µm or more and 70 µm or less.

The word "thickness" refers to an arithmetic average of thicknesses measured at randomly selected 10 points.

Martens Hardness

The surface protecting resin member according to the present exemplary embodiment preferably has a Martens hardness of 0.5 N/mm² or more and 220 N/mm² or less, more preferably 1 N/mm² or more and 80 N/mm² or less, still more preferably 1 N/mm² or more and 70 N/mm² or less, and still more preferably 1 N/mm² or more and 5 N/mm² or less, at 23° C.

The Martens hardness (23° C.) is 0.5 N/mm² or more, and thus, the surface protecting resin member is likely to maintain a form required as a resin member. On the other hand, the Martens hardness is 220 N/mm² or less, and thus, the ability to heal a flaw (i.e., self-healing property) is likely to be improved.

Restoration Percentage

The surface protecting resin member according to the present exemplary embodiment preferably has a restoration percentage of 70% or more and 100% or less, more preferably 80% or more and 100% or less, and still more preferably 90% or more and 100% or less, at 23° C.

The restoration percentage is an index of the self-healing property (property of restoring distortion caused by stress within one minute after the stress is unloaded, in other words, a degree of healing a flaw) of a resin member. The restoration percentage (at 23° C.) is 70% or more, and thus, the easiness of healing a flaw (i.e., self-healing property) is improved.

The Martens hardness and the restoration percentage of the surface protecting resin member may be adjusted by controlling, for example, the hydroxyl value of the specific acrylic resin (a), the hydroxyl value of the specific polyol (b), the number of carbon atoms of the chain connecting hydroxy groups to each other in the specific polyol (b), the ratio of the amount of the specific polyol (b) to the amount of the specific acrylic resin (a), the number of functional groups (isocyanate groups) in the multifunctional isocyanate (d), and/or the ratio of the amount of the multifunctional isocyanate (d) to the amount of the specific acrylic resin (a).

The Martens hardness and the restoration percentage are measured by using FISCHERSCOPE HM2000 (manufactured by Fischer Instruments K.K.). The surface protecting resin member (sample) is fixed to a slide glass with an adhesive and set to the above apparatus. A load is applied to the surface protecting resin member, at a certain measuring temperature (e.g., 23° C.), up to 0.5 mN over 15 seconds and maintained at 0.5 mN for 5 seconds. The largest displacement during the application of the load is denoted by h1. Thereafter, the load is unloaded to 0.005 mN over 15 seconds and maintained at 0.005 mN for 1 minute. The displacement during the maintenance of the load is denoted by h2. The restoration percentage [(h1−h2)/h1]×100(%) is calculated. The Martens hardness is determined by the load-distortion curve obtained by the measurement.

Applications

The surface protecting resin member according to the present exemplary embodiment may be used as a surface protecting member for, for example, a product that may get a scratch or a flaw on the surface due to a contact with another substance and that is required to have the surface slipperiness.

Specific examples of such a product include automotive members (e.g., automotive interior, automotive bodies, and door handles), building materials (e.g., floor materials, tiles, wall materials, and wall paper), the displays or the bodies other than the displays of portable devices (e.g., smartphones, cell phones, and portable game devices), the displays of touch panels, storage containers (e.g., suitcases), cosmetic containers, eyeglasses (e.g., frames and lenses), sporting goods (e.g., golf clubs and rackets), writing tools (e.g., fountain pens), music instruments (e.g., exterior of pianos), tools for storing clothes (e.g., hangers), leather products (e.g., bags and bookbags), decoration films, film mirrors, and members for image forming apparatus, such as copiers, (e.g., transferring members, such as transferring belts).

EXAMPLES

Hereinafter, exemplary embodiments of the present disclosure will be described in detail with reference to Examples and Comparative Examples. The exemplary embodiments of the disclosure are not limited to the Examples below. In the following description, the unit "part" is based on mass, unless stated otherwise.

Example 1

Synthesis of Acrylic Resin 1 (Having Fluorine Atom in Side Chain)

Polymerizable monomers such as n-butyl methacrylate (nBMA), hydroxyethyl methacrylate (HEMA), and an acrylic monomer having a perfluoro group (FAMAC-6 manufactured by UNIMATEC CO., LTD.) are mixed together at a molar ratio of 25:30:5. Furthermore, 2 mass % of a polymerization initiator (azobisisobutyronitrile (AIBN)) relative to the polymerizable monomers and 40 mass % of methyl ethyl ketone (MEK) relative to the polymerizable monomers are added to the mixture to prepare a polymerizable monomer solution.

The polymerizable monomer solution is poured into a dropping funnel and dropped over three hours, during stirring, to 50 mass % of MEK, the temperature of which has been raised to 80° C. under a nitrogen stream, relative to the polymerizable monomers, to perform polymerization. Furthermore, a liquid containing 10 mass % of MEK relative to the polymerizable monomers and 0.5 mass % of AIBN relative to the polymerizable monomers is dropped over one hour to finish the reaction. During the reaction, the temperature is maintained at 80° C., and stirring is continued. An acrylic resin 1 is synthesized in such a manner.

The hydroxyl value of the obtained acrylic resin 1 is measured by the method defined by JIS K0070-1992 (potentiometric titration) and is determined to be 175 mgKOH/g.

The weight-average molecular weight of the acrylic resin 1 is measured by the above-described method using gel permeation chromatography (GPC) and is determined to be 17,000.

The molar ratio of the side chain containing fluorine atoms (perfluoro group) relative to all side chains of the acrylic resin 1 is 8.3%.

Synthesis of Acrylic Resin 2 (Having No Fluorine Atom)

An acrylic resin 2 is synthesized in the same manner as the acrylic resin 1, except that an acrylic monomer having a perfluoro group (FAMAC-6 manufactured by UNIMATEC CO., LTD.) used in synthesizing the acrylic resin 1 is not used, and that polymerizable monomers such as n-butyl methacrylate (nBMA) and hydroxyethyl methacrylate (HEMA) are mixed together at a molar ratio of 30:30 to synthesize the resin.

The obtained acrylic resin 2 has a hydroxyl value of 206 mgKOH/g.

The molar ratio of the side chain containing fluorine atoms (perfluoro group) to all side chains of the acrylic resin 2 is 0%.

Preparation of Resin-Film Forming Liquid 1

The following components are mixed together and stirred to prepare the liquid A1.

acrylic resin 1 (solid content 50 mass %): the amount indicated in Table 1 as solid content acrylic resin 2 (solid content 50 mass %): the amount indicated in Table 1 as solid content The following components are mixed together and stirred to prepare the liquid A2.

Polyol 1 (polycaprolactone triol, PLACCEL 308, manufactured by Daicel Corporation, molecular weight 850, hydroxyl value 190 to 200 mgKOH/g): 30 parts methyl ethyl ketone: 200 parts The following components are mixed together and stirred to prepare the liquid B1.

isocyanate (DURANATE TPA100 manufactured by Asahi Kasei Chemicals Corporation, compound name: hexamethylene diisocyanate having a polyisocyanurate structure): the amount indicated in Table 1 as solid content fluorotelomer alcohol 1 (6:2-fluorotelomer alcohol, $CF_3$ $(CF_2)_5$—$(CH_2)_2$—OH): the amount indicated in Table 1

First, a reaction accelerator 1 (catalyst, inorganic bismuth, NEOSTANN U-600 manufactured by Nitto Kasei Co., Ltd.)

is added to the liquid B1 in the amount indicated in Table 1 and is allowed to stand for 60 minutes.

Next, the liquid A1 and the liquid A2 are added to the liquid B1. Furthermore, ultraviolet (UVA) absorber particles (product name: VANARESIN UVA-7075 manufactured by Shin Nakamura Chemical Co., Ltd.) and a radical scavenger (HALS)(product name: Tinuvin 765 manufactured by BASF. Com) are added and stirred, and defoamed at reduced pressure for five minutes to prepare a resin-film forming liquid 1.

Formation of Resin Film 1

The resin-film for forming liquid 1 is applied to a polyimide film (substrate) with a wire bar and thereafter, is cured at 80° C. for 1 hour and then at 130° C. for 30 minutes to form a resin film 1 having an average film thickness of 30 µm.

Example 2

Only the acrylic resin 2 having no fluorine atom is used as the acrylic resin to form a resin film.

Specifically, a resin film 2 is formed in the same manner as in Example 1, except that the amounts (solid contents) of the liquid A1, the liquid A2, the liquid B1, the accelerator, and the particle are changed to the respective amounts indicated in Table 1.

Example 3

Preparation of Resin-Film Forming Liquid 3

The following components are mixed together and stirred to prepare the liquid A1.

acrylic resin 1 (solid content 50 mass %): the amount indicated in Table 1 as solid content acrylic resin 2 (solid content 50 mass %): the amount indicated in Table 1 as solid content The following components are mixed together and stirred in the same manner as in Example 1 to prepare the liquid A2.

Polyol 1 (polycaprolactone triol, PLACCEL 308 manufactured by Daicel Corporation, molecular weight: 850, hydroxyl value: 190 to 200 mgKOH/g)

Methyl Ethyl Ketone

The liquid B1 is the following component.

isocyanate (DURANATE TPA100 manufactured by Asahi Kasei Chemicals Corporation, compound name: hexamethylene diisocyanate having a polyisocyanurate structure): the amount indicated in Table 1 as solid content First, the liquid A1 and the liquid A2 are added to the liquid B1. Furthermore, the fluorotelomer alcohol 1 (6:2-fluorotelomer alcohol, $CF_3(CF_2)_5$—$(CH_2)_2$—OH) is added in the amount indicated in Table 1, and next, the reaction accelerator 1 (catalyst, inorganic bismuth, NEOSTANN U-600 manufactured by Nitto Kasei Co., Ltd.) is added in the amount indicated in Table 1. Furthermore, ultraviolet (UVA) absorber particles (product name: VANARESIN UVA-7075 manufactured by Shin Nakamura Chemical Co., Ltd.) and a radical scavenger (HALS) (product name: Tinuvin 765 manufactured by BASF. Com) are added and stirred, and defoamed at reduced pressure for five minutes to prepare a resin-film forming liquid 3.

Formation of Resin Film 3

Thereafter, a resin film 3 is formed in the same manner as in Example 1, except that a resin-film forming liquid 3 is used.

Examples 4, 5, and 6

Resin films 4, 5, and 6 are respectively formed in the same manner as in Examples 1, 2, and 3, except that the fluorotelomer alcohol 2 (5:2-fluorotelomer alcohol, $CF_3(CF_2)_4$—$(CH_2)_2$—OH) is used instead of the fluorotelomer alcohol 1.

Comparative Example 1

Synthetic Example 1: Synthesis of Siloxane Component B

In a 500-ml flask equipped with a stirrer, a thermometer, a capacitor, and a nitrogen-gas introducing pipe, 106 parts of ethanol, 270 parts of methyltrimethoxysilane, 23 parts of γ-methacryloxypropylmethyldimethoxysilane, 100 parts of deionized water, 1 part of 1 mass % hydrochloric acid, and 0.1 parts of hydroquinone monomethyl ether are placed to synthesize polysiloxane.

The concentration is adjusted to 50 mass % with methyl isobutyl ketone to prepare a siloxane component B (for copolymerization).

Synthetic Example 2: Synthesis of Polydimethylsiloxane-Based Graft Copolymer E

In the equipment the same as that in Synthetic Example 1, 50 parts of toluene and 50 parts of methyl isobutyl ketone are placed, and the temperature is raised to 80° C. Separately, 20 parts of methyl methacrylate, 26 parts of butyl methacrylate, 23 parts of 2-hydroxyethyl methacrylate, 10 parts of siloxane component B, 1 part of methacrylic acid, 20 parts of one-terminal methacryl-modified polydimethylsiloxane (X-22-174DX manufactured by Shin-Etsu Chemical Co., Ltd., molecular weight: 5,000), and 1 part of azobis-2-methylbutyronitrile (ABN-E manufactured by Japan Hydrazine Company, Inc.) are mixed together, and the monomer mixture is dropped to the liquid mixture of toluene and methyl isobutyl ketone over three hours. Thereafter, the reaction is performed for six hours to synthesize a polydimethylsiloxane-based graft copolymer E. The obtained graft copolymer E has a solid content of 50%.

Formation of Resin Film 7

To the mixture of 85 parts of polydimethylsiloxane-based graft copolymer E obtained in Synthetic Example 2 and 15 parts of tetrafunctional caprolactone polyol (PLACCEL 410D manufactured by Daicel Corporation, molecular weight: 1,000, hydroxyl value: 220), 36 parts of HMDI isocyanurate (TAKENATE D-170N manufactured by Takeda Pharmaceutical Company Limited, solid content: 100%, NCO content: 20.7 mass %) is added as a crosslinking agent. The obtained coating material is applied to a polished soft steel plate and a glass plate (substrate) to form a film on each plate such that the film has a film thickness of 25 µm or more and 30 µm or less after drying.

The obtained coated plates are dried at 60° C. for an hour and thereafter, allowed to stand for a week at room temperature to prepare a resin film 7.

Comparative Example 2

Synthetic Example 1: Silicone Moiety-Containing Urethane Acrylate Copolymer 1: UA-1

In a 2-L separable flask equipped with a thermometer, a stirrer, and a reflex condenser, 190.0 g of polycarbonate diol containing 1,5-pentanediol/1,6-hexanediol (DURANOL T5650E manufactured by Asahi Kasei Chemicals Corporation, hydroxyl value: 112 mgKOH/g), 10.0 g of silicone diol (SF-8427 manufactured by Toray Dow Corning Corp., hydroxyl value: 56.1 mgKOH/g), and 74.8 g of isophorone diisocyanate (IPDI) are placed. As a solvent, 274.8 g of methyl ethyl ketone (MEK) is added. Furthermore, 0.03 g of dibutyltin dilaurate is added as a catalyst, and 0.14 g of dibutyl hydroxytoluene (BHT) is added as an antioxidant. The reaction is performed at 75° C. for four hours. The reaction ratio (mass ratio) of polycarbonate diol/silicone diol/IPDI is 69.1/3.7/27.2.

After the 4-hour reaction, 32.8 g of an isocyanate compound having an acryloyl group (reaction product of 2-hydroxyethyl acrylate and IPDI: Z-TU-3 manufactured by TOKUSHIKI Co., Ltd., NCO content: 12.3 mass %), 0.15 g of methoquinone and 17.1 g of MEK as polymerization inhibitors, and 0.06 g of dibutyltin dilaurate as a catalyst are further added. The reaction is further performed at 75° C. for three hours. Thereafter, 170.0 g of MEK is added to obtain a MEK solution of a silicone moiety-containing urethane acrylate copolymer 1 (UA-1).

The obtained UA-1 has a molecular weight of 4,100. The MEK solution thereof (nonvolatile content 40%) has a viscosity of 400 mPa·s (at 25° C.).

Preparation Example 1: Copolymer Composition: UA Composition-1

Hundred parts of MEK solution of UA-1 synthesized in Synthetic Example 1 (nonvolatile content 40 mass %), 10 parts of caprolactone-modified di-pentaerythritol hexaacrylate (KAYARAD DPCA-120 manufactured by Nippon Kayaku Co., Ltd.) as a polyacrylate compound, and 56.7 parts of MEK are mixed together. The mixture is stirred with HOMOGENIZING DISPER at room temperature for 10 minutes to obtain 30% MEK solution of a copolymer composition 1 (UA composition-1).

Method for Forming Cured Product (Cured Coating Film) of Copolymer Composition a) Five parts of a photopolymerization initiator, IRGA-CURE 184 (manufactured by BASF. Com), is mixed with 100 parts of the copolymer composition 1 [nonvolatile content (solid content)]. The amount of methyl ethyl ketone (MEK), which is the solvent, is appropriately adjusted such that the coating liquid of the copolymer composition 1 has a viscosity suitable for formation of a film having the film thickness described below.

b) The coating liquid is sufficiently stirred to be uniform and defoamed. Thereafter, the liquid is applied to an easy adhesion PET film (COSMOSHINE (registered trademark) A-4100 manufactured by TOYOBO CO., LTD., film thickness: 125 μm, substrate) with a film applicator to form a coating film having a dry film thickness of 25 μm (formation of a coating film).

c) The coating film is dried at a drying temperature of 80° C. for three minutes to remove the solvent and thereafter, irradiated with UV light by using a UV irradiator (one 80 W high-pressure mercury lamp) such that the integrated quantity of light is 500 mJ/cm$^2$. According to such processes, a resin film 8 having a film thickness of 25 μm is formed on the PET film.

Measurement of Physical Properties

Reaction Percentage of Fluorotelomer Alcohol Regarding the resin films in Examples 1 to 6, the mass ratio of the fluorotelomer alcohol bonded to the multifunctional isocyanate (reaction percentage of fluorotelomer alcohol), in other words, the fluorotelomer alcohol that forms —(CH$_2$)$_2$—NHCO—, to the total amount of the fluorotelomer alcohol used for forming a resin film is calculated by the above-described method using FT-IR. The results are summarized in Table 2.

Martens Hardness

The Martens hardness (N/mm$^2$) of the resin film obtained in each of Examples and Comparative Examples is measured at 23° C. by the above-described method. The results are summarized in Table 2.

Evaluation 1/Wear Resistance Test

The resistance test is performed by rubbing, with steel wool, the surface of the resin film obtained in each of Examples and Comparative Examples.

Specifically, the wear resistance test is performed with an abrasion tester (product name: TYPE: 30S manufactured by Shinto Scientific Co., Ltd.). The wear resistance test includes rubbing back and forth 50 times the surface of the resin film with steel wool (#0000) under a load of 200 g.

Before and after the wear resistance test, the following properties of the resin film are measured.

Self-Healing Property (Healing Time)

Before and after the wear resistance test, the resin film is scratched by moving a metal brush back and forth 50 times on the resin film for 3 cm at a rate of 30 cm/min under a load of 0.3 N. Then the time for healing scratches is measured at 25° C.

Furthermore, after the wear resistance test, the resin film is scratched in the same manner, except that the load is changed to 0.5 N. Then the time for healing scratches is measured at 25° C.

The healing time refers to the time taken until the scratches are disappeared, in other words, the time taken until the scratches are not recognized by visual observation.

Fluorine Content at Surface

Before and after the wear resistance test, the amount of fluorine atoms at the surface (at %) of the resin film is measured by x-ray photoelectron spectroscopy (XPS). The amount of fluorine atoms is measured with an XPS analyzer (type: PHI5000 Versa Probe II manufactured by ULVAC-PHI, Inc.) under the following conditions.

Measurement Conditions
x-ray source: monochromated AlKa
output: 25 W, 15 kV
detection area: 100 μmϕ
incidence angle: 900
take-off angle: 450
charge neutralization: charge neutralization gun condition 1.0 V/ion gun 10 V Cross-Cut Adhesion Before the wear resistance test, in conformity with JIS K 5600-5-6 (1999), the adhesion between the substrate and the resin film is evaluated by the cross-cut method. The evaluation is performed in accordance with the following evaluation criteria.

Evaluation criteria
G0: no separation
G1: partial separation
G2: complete separation Friction Coefficient (Dynamic Friction Coefficient with respect to Sapphire Needle)

Before and after the wear resistance test, the dynamic friction coefficient of the resin film is measured. By using the variable-load double-rub friction measurement mode of Variable Normal Load Friction and Wear Measurement System HEIDON TriboGear HHS2000 (manufactured by Shinto Scientific Co., Ltd.), while a scratch needle (made of sapphire, tip radius r=0.1 mm) moves back and forth on the surface of the resin film for 30 mm at a rate of 10 mm/sec under a vertical load of 10 g or more and 30 g or less in an environment of a temperature of 23° C. and a humidity of 55%, the dynamic frictional resistance with respect to the scratching needle in the scanning direction is measured, and the dynamic friction coefficient is calculated.

Water Repellency (Water Contact Angle) and Oil Repellency (Hexadecane Contact Angle)

Before and after the wear resistance test, the contact angle between the resin film and water and the contact angle between the resin film and hexadecane are measured. The contact angle is measured by dropping 1 μl of water or hexadecane, with a syringe, on the surface of the resin film. A contact angle meter (type: CA-X manufactured by Kyowa Interface Science Co., Ltd.) is used for the measurement.

Evaluation 2/Light Resistance Test

The light resistance test of the resin film obtained in each of Examples and Comparative Examples is performed by irradiating the resin film with UV light having a wavelength of 300 to 400 nm at an irradiation intensity of 76 W/m$^2$ for 2,000 hours by using an ultraviolet lamp.

After the light resistance test, the following properties of the resin film are measured.

Color Difference ΔE

Before and after the light resistance test, the hue of the resin film is measured with a spectrophotometer (RM200QC manufactured by X-Rite Inc.) to determine the color difference ΔE calculated with the formula described below. The chromaticity E is a value calculated with $E=\{(L')^2+(a')^2+(b')^2\}^{1/2}$. L', a', and b' are the coordinate values in the L'a'b' color system. When the color difference ΔE is 4.0 or lower, the resin film is evaluated to be good.

ΔE=|chromaticity of surface to be irradiated before light resistance test−chromaticity of irradiated surface after light resistance test|

Bleed-Out

After the light resistance test, the occurrence of the phase separation of the particle at the surface of the resin film and the presence of the particle on the surface of the resin film are checked by visual observation and tactile sensation.

Evaluation criteria

A (G): neither phase separation nor the presence of particles are confirmed.

B (P): presence of particles are confirmed by visual observation.

The results are summarized in Table 2.

TABLE 1

| Composition | | Example 1 | Example 2 | Example 3 | Example 4 | Example 5 | Example 6 | Comparative Example 1 | Comparative Example 2 |
|---|---|---|---|---|---|---|---|---|---|
| Liquid A1 | Acrylic resin 1 (with F) | 15 | — | 15 | 15 | — | 15 | — | — |
| | Acrylic resin 2 (without F) | 12 | 27 | 12 | 12 | 27 | 12 | | |
| Liquid A2 | Polyol 1 | 30 | 30 | 30 | 30 | 30 | 30 | | |
| Liquid B1 | Isocyanate 1 | 40 | 40 | 40 | 40 | 40 | 40 | | |
| | Fluorotelomer alcohol 1 | 3.00 | 4.00 | — | — | — | — | | |
| | Fluorotelomer alcohol 2 | — | — | — | 3.00 | 4.00 | — | | |
| Post addition | Fluorotelomer alcohol 1 | — | — | 3.00 | — | — | — | | |
| | Fluorotelomer alcohol 2 | — | — | — | — | — | 3.00 | | |
| Accelerator | Reaction accelerator (catalyst) 1 | 0.15 | 0.15 | 0.5 | 0.15 | 0.15 | 0.5 | | |
| Particle | Ultraviolet absorber particle | 1 | 1 | 1 | 1 | 1 | 1 | | |
| | Radical scavenger | 0.5 | 0.5 | 0.5 | 0.5 | 0.5 | 0.5 | | |

(*)The composition is based on solid content, and the amount of solvent is not included. (unit: parts by mass)

TABLE 2

| | | | Example 1 | Example 2 | Example 3 | Example 4 | Example 5 | Example 6 | Comparative Example 1 | Comparative Example 2 |
|---|---|---|---|---|---|---|---|---|---|---|
| Physical properties | | Reaction percentage of fluorotelomer alcohol [mass %] | 95 | 92 | 45 | 85 | 87 | 42 | — | — |
| | | Martens hardness [N/mm$^2$] | 5.0 | 4.8 | 4.6 | 4.7 | 4.4 | 4.5 | 4.0 | 1.1 |
| Before wear resistance test | Self-healing property | Healing rate of 0.3N scratches/Disappearance time by visual determination | 5 sec or less | 10 sec or less | 10 sec or less | 10 sec or less | 10 sec or less | 10 sec or less | 10 sec or less | 10 sec or less |
| | F content at surface | XPS [at %] | 25 | 22 | 23 | 24 | 21 | 20 | — | — |
| | Adhesion | Cross-cut adhesion | G0 | G0 | G1 | G0 | G0 | G1 | G0 | G0 |
| | Friction coefficient | Heidon friction coefficient (μ1) | 0.9 | 1.0 | 1.1 | 1.2 | 1.1 | 1.2 | 1.1 | 0.9 |

TABLE 2-continued

|  |  |  | Example 1 | Example 2 | Example 3 | Example 4 | Example 5 | Example 6 | Comparative Example 1 | Comparative Example 2 |
|---|---|---|---|---|---|---|---|---|---|---|
|  | Water repellency | Water contact angle [°] | 107 | 104 | 105 | 105 | 102 | 101 | 102 | 101 |
|  | Oil repellency | Hexadecane contact angle [°] | 57 | 52 | 55 | 54 | 50 | 50 | 51 | 50 |
| After wear resistance test | Self-healing property | Healing rate of 0.3N scratches/Disappearance time by visual determination | no scratches | 10 sec or less | 30 sec or less | 30 sec or less | 30 sec or less | 30 sec or less | 5 min or less | 5 min or less |
|  |  | Healing rate of 0.5N scratches/Disappearance time by visual determination | 10 sec or less | 1 min or less | 5 min or less | 1 min or less | 1 min or less | 5 min or less | 5 min or more | 5 min or more |
|  | F content at surface | XPS [at %] | 25 | 22 | 21 | 23 | 21 | 20 | — | — |
|  | Friction coefficient | Heidon friction coefficient (μ2) | 0.8 | 1.0 | 1.3 | 1.3 | 1.2 | 1.3 | 1.4 | 1.2 |
|  | Water repellency | Water contact angle [°] | 107 | 103 | 104 | 104 | 101 | 100 | 99 | 96 |
|  | Oil repellency | Hexadecane contact angle [°] | 55 | 51 | 55 | 52 | 49 | 49 | 45 | 43 |
| Change in dynamic friction coefficient [μ2/μ1] |  |  | 0.89 | 1.00 | 1.18 | 1.08 | 1.09 | 1.08 | 1.27 | 1.33 |
| After light resistance test | Stress after 2000 h irradiation | Light resistance ΔE | 3.0 | 3.2 | 5.6 | 2.9 | 3.3 | 3.5 | 6.5 | 7.2 |
|  |  | Bleed-out | A (G) | A (G) | B (P) | A (G) | A (G) | B (P) | B (P) | B (P) |

As summarized in Tables, Examples that contain resin films containing the cured product of the composition containing the specific acrylic resin (a), the specific polyol (b), the fluorotelomer alcohol (c), and the multifunctional isocyanate (d) have high flaw resistance and high surface slipperiness and maintain high surface slipperiness, and furthermore, have high water repellency, high oil repellency, and high adhesion with respect to the substrate, compared with Comparative Examples 1 and 2 that do not contain a fluorotelomer alcohol.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A surface protecting resin member comprising:
a cured product of a composition containing:
an acrylic resin having a hydroxyl value within a range of 40 mgKOH/g to 280 mgKOH/g;
a polyol having a hydroxyl value within a range of 40 mgKOH/g to 300 mgKOH/g;
a multifunctional isocyanate; and
a fluorotelomer alcohol represented by the following general formula:

$$CF_3(CF_2)_n-(CH_2)_m-OH$$

where n is an integer of 1 or more and m is an integer within a range of 1 to 4,
wherein a mass ratio of the fluorotelomer alcohol to a total solid content in the composition is within a range of 1 mass % to 20 mass %.

2. The surface protecting resin member according to claim 1, wherein a mass ratio of the fluorotelomer alcohol bonded to the multifunctional isocyanate in the cured product to a total amount of the fluorotelomer alcohol in the composition is 60 mass % or more.

3. The surface protecting resin member according to claim 1, wherein n in the general formula is within a range of 4 to 19.

4. The surface protecting resin member according to claim 3, wherein n in the general formula is within a range of 4 to 6.

5. The surface protecting resin member according to claim 1, wherein the acrylic resin has a side chain containing a fluorine atom.

6. The surface protecting resin member according to claim 5, wherein a molar ratio of the side chain containing a fluorine atom to all side chains of the acrylic resin is 7% or more.

7. The surface protecting resin member according to claim 1, wherein the polyol has hydroxy groups bonded to each other via a carbon chain having 6 or more carbon atoms.

8. The surface protecting resin member according to claim 1, further containing a particle.

9. The surface protecting resin member according to claim 1, wherein:
the surface protecting resin member has a dynamic friction coefficient μ1 within a range of 0.8 to 1.5 in an environment of a temperature of 23° C. and a humidity of 55%, and
a ratio of a dynamic friction coefficient μ2 of the surface protecting resin member in an environment of a temperature of 23° C. and a humidity of 55% after a wear resistance test to the dynamic friction coefficient μ1, [μ2/μ1], is within a range of 0.8 to 1.2, the wear resistance test being a test in which a surface of a surface protecting resin member is rubbed back and forth 50 times with steel wool (#0000) under a load of 200 g.

10. A liquid set for producing a surface protecting resin member comprising:
the liquid set selected from:
a liquid set containing liquid A1 containing an acrylic resin having a hydroxyl value within a range of 40 mgKOH/g to 280 mgKOH/g, liquid A2 containing a polyol having a hydroxyl value within a range of 40 mgKOH/g to 300 mgKOH/g, and liquid B1 containing a multifunctional isocyanate; and
a liquid set containing liquid A containing an acrylic resin having a hydroxyl value within a range of 40 mgKOH/g to 280 mgKOH/g and a polyol having a hydroxyl value within a range of 40 mgKOH/g to 300 mgKOH/g and liquid B2 containing a multifunctional isocyanate,
wherein at least one of the liquid A1, the liquid A2, and the liquid B1, or at least one of the liquid A and the liquid B2 contains a fluorotelomer alcohol represented by the following general formula:

$$CF_3(CF_2)_n-(CH_2)_m-OH$$

where n is an integer of 1 or more and m is an integer of 1 or more and 4 or less.

11. The liquid set according to claim 10, wherein the liquid B1 contains the fluorotelomer alcohol.

12. The liquid set according to claim 10, wherein the liquid B2 contains the fluorotelomer alcohol.

13. The liquid set according to claim 10, wherein a mass ratio of the fluorotelomer alcohol to a total solid content in the liquid set is within a range of 1 mass % to 20 mass %.

14. The liquid set according to claim 10, wherein n in the general formula is within a range of 4 to 19.

15. The liquid set according to claim 14, wherein n in the general formula is within a range of 4 to 6.

16. The liquid set according to claim 10, wherein the acrylic resin has a side chain containing a fluorine atom.

17. The liquid set according to claim 16, wherein a molar ratio of the side chain containing a fluorine atom to all side chains of the acrylic resin is 7% or more.

18. The liquid set according to claim 10, wherein the polyol has hydroxy groups bonded to each other via a carbon chain having 6 or more carbon atoms.

19. The liquid set according to claim 10, wherein at least one of the liquid A1, the liquid A2, and the liquid B1, or at least one of the liquid A and the liquid B2 contains a particle.

20. A surface protecting resin member comprising:
a cured product of a composition containing:
an acrylic resin having a hydroxyl value within a range of 40 mgKOH/g to 280 mgKOH/g;
a polyol having a hydroxyl value within a range of 40 mgKOH/g to 300 mgKOH/g;
a multifunctional isocyanate; and
a fluorotelomer alcohol represented by the following general formula:

$$CF_3(CF_2)_n-(CH_2)_m-OH$$

where n is an integer of 1 or more and m is an integer within a range of 1 to 4,
wherein the acrylic resin has a side chain containing a fluorine atom, and a molar ratio of the side chain containing a fluorine atom to all side chains of the acrylic resin is 7% or more.

* * * * *